United States Patent [19]

Dunne

[11] Patent Number: 5,617,199
[45] Date of Patent: Apr. 1, 1997

[54] DEVICE, AND ASSOCIATED METHOD, FOR DETERMINING DISTANCES BETWEEN MOVING OBJECTS

[75] Inventor: Jeremy G. Dunne, Littleton, Colo.

[73] Assignee: Laser Technology, Inc., Englewood, Colo.

[21] Appl. No.: 429,110

[22] Filed: Apr. 26, 1995

[51] Int. Cl.$^6$ .............................. G01C 3/08; G01P 3/36; B60T 7/16
[52] U.S. Cl. .......................... 356/5.01; 356/28; 356/28.5; 180/169
[58] Field of Search .................. 356/3.01–5.15, 356/28, 28.5; 180/169

[56] References Cited

U.S. PATENT DOCUMENTS

| | | | |
|---|---|---|---|
| 4,833,469 | 5/1989 | David | 340/901 |
| 4,839,658 | 6/1989 | Kathol et al. | 342/455 |
| 5,359,404 | 10/1994 | Dunne | 356/5 |
| 5,475,494 | 12/1995 | Nishida et al. | 356/4.01 |

*Primary Examiner*—Stephen C. Buczinski
*Attorney, Agent, or Firm*—William J. Kubida; Holland & Hart

[57] ABSTRACT

A device, and an associated method, for determining separation distances separating motor vehicles travelling along a roadway. A separation distance separating the motor vehicles is calculated responsive to targeting the vehicles with a laser range finder and determining the speeds of the vehicles. From this information, the separation distances separating the motor vehicles can be calculated. If the separation distance separating the motor vehicles is less than a minimum distance, then the calculated separation distance can be utilized by traffic enforcement officials to take appropriate enforcement actions.

16 Claims, 3 Drawing Sheets

DEVICE, AND ASSOCIATED METHOD, FOR DETERMINING DISTANCES BETWEEN MOVING OBJECTS

CROSS REFERENCE TO RELATED PATENTS

This application is related to U.S. Pat. No. 5,359,404, assigned to the assignee of the present application, and the contents thereof are incorporated by reference herein.

BACKGROUND OF THE INVENTION

The present invention relates generally to speed and distance detection. More particularly, the present invention relates to a detecting device, and an associated method, for detecting distances separating moving objects, such as moving vehicles.

Distances separating moving vehicles can be determined, and an indication can be provided when the distances are less than minimum values. By providing constabulary, or other traffic enforcement, officials of indications when moving vehicles are not separated by at least minimum separation distances, appropriate enforcement action can be taken by the officials.

Operation of motor vehicles by motorists is widely regulated to provide for the public safety. Motor vehicle codes governing many different facets of motor vehicle operation have been enacted in most governmental jurisdictions. Enforcement of the motor vehicle codes by constabulary officials ensures compliance with the motor vehicle codes.

Safety conditions require, for instance, that motor vehicles by operated within certain speeds. Many governmental jurisdictions have implemented, as part of their motor vehicle codes, provisions defining speed limits within which operators of motor vehicles must operate the motor vehicles when travelling on public roadways.

Various devices have been developed to assist officials in enforcement of provisions of the motor vehicle codes relating to speed limits. For instance, a laser-based speed measuring device disclosed in the aforementioned patent, U.S. Pat. No. 5,3590,404, can be used by officials to obtain quantitative speed indications of motor vehicles.

Safety considerations also require that a motorist operating a motor vehicle on a roadway maintain at least a minimum separation distance between the motor vehicle and a motor vehicle travelling thereinfront. Various governmental jurisdictions have also implemented, as parts of their motor vehicle codes, provisions defining minimum distances which must be maintained between motor vehicles when the motor vehicles are operated on a roadway. That is to say, the motor vehicle codes include provisions prohibiting "tailgating."

The maintenance of proper separation distances between motor vehicles is important to minimize the risk of collision when a forward-most motor vehicle makes a sudden stop, or other unanticipated maneuver. If a proper separation distance is not maintained between the forward-most vehicle and a vehicle travelling therebehind, a motorist operating the rear-most vehicle might be unable to react to the sudden stop or other maneuver of the forward-most vehicle in time to avoid a collision. When the motor vehicles are operated at increased velocities, the separation distance separating motor vehicles must be increased to ensure that an operator of a rear-most vehicle can properly react to sudden stop or other maneuver of the forward-most motor vehicle.

Enforcement of such provisions of motor vehicle codes conventionally requires constabulary or other traffic enforcement officials to make a visual determination of the distances separating motor vehicles as the vehicles travel along a roadway. Visual determinations of the separation distances are inherently qualitative, and typically rely primarily upon the judgment of the officials making the determinations.

A technique by which separation distances separating motor vehicles can be quantitatively determined would be beneficial. The technique would have to be amenable to usage by constabulary, or other traffic enforcement, officials in enforcement procedures. That is to say, the technique must not only be accurate, but also provide indications of the separation distances in a timely manner to permit enforcement procedures to be made.

It is with respect to these considerations and other background information relative to speed and distance detection devices that the significant improvements of the present invention have evolved.

SUMMARY OF THE INVENTION

The present invention advantageously provides a distance determining device, and an associated method, which determines distances separating moving objects, such as the separation distances separating motor vehicles as the motor vehicles travel along a roadway.

The separation distances are determined quantitatively and nearly-instantaneously. The present invention is amenable for usage by constabulary, or other traffic enforcement, officials in enforcement operations to ensure compliance of motor vehicle operators with applicable motor vehicle codes.

In accordance with the present invention therefore, a device, and an associated method, for determining values representative of a separation distance separating first and second moving objects is disclosed. A range determiner is positioned at a remote position remote from the first and second moving objects. The range determiner determines a first range between the remote position and the first moving object. The range determiner further determines a second range between the remote position and the second moving object. A speed determiner determines values of speed of at least one of the first moving object and the second moving object. And, calculating circuitry is operative responsive to the first range and the second range calculated by the range determiner, the speed determined by the speed determiner, and the times at which the ranges are determined. The calculating circuitry calculates values representative of the separation distance separating the first and second moving objects.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
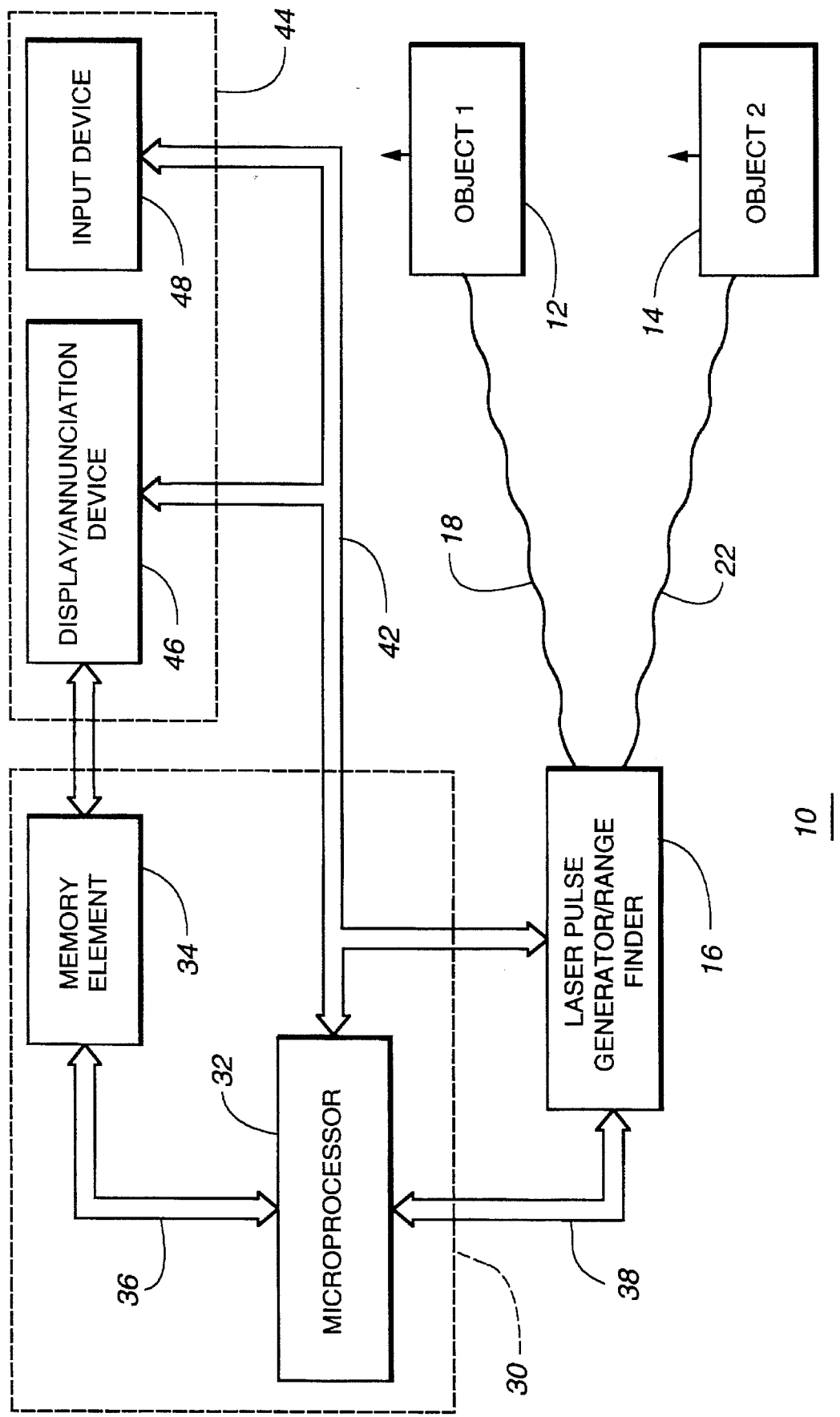
FIG. 1 is a functional block diagram of a device for determining a separation distance between moving objects according to an embodiment of the present invention.

FIG. 1 illustrates the device, shown generally at 10, of an embodiment of the present invention. The device 10 determines a separation distance separating first and second moving objects 12 and 14, respectively. The device 10 includes circuitry and elements corresponding to structure disclosed in the aforementioned patent, U.S. Pat. No. 5,359,404, to determine ranges to, and speeds of, moving objects. Additional details of portions of the device 10 and various facets of its operation are disclosed therein.

The device 10 includes a laser pulse generator/range finder 16. The pulse generator/range finder 16 is operative to generate laser pulses, here indicated by lines 18 and 22 for transmission to, and reflection from, the objects 12 and 14. The pulse generator/range finder 16 also includes circuitry for detecting portions of the laser pulses reflected back from the objects 12 and 14. As described more fully in the aforementioned patent, a suitable, high voltage power supply powers the pulse generator/range finder 16 to power operation of the pulse generator/range finder to cause generation of desired numbers of laser pulses and to detect reflections of such pulses.

The device 10 also includes a microcontroller 30, here formed of a microprocessor 32 and a memory element 34. The memory element 34 is coupled to the microprocessor 32 by way of a bus 36. Algorithms executed by the microprocessor 32 during operation of the device 10 are stored in the memory element 34. The microcontroller 30 is coupled to the laser pulse generator/range finder 16 by way of buses 38 and 42. The microcontroller 30 is operative to control operation of the laser pulse generator/range finder 16 and also to receive data generated during operating of the pulse generator/range finder. The microcontroller 30 is operative to compute the distance to the objects 12 and 14 responsive to time periods required to transmit laser pulses to the moving objects 12 and 14 and to receive reflections therefrom.

The microcontroller 30 is further operative to calculate the speed of the moving objects 12 and 14 responsive to determinations of the distances to the objects 12 and 14.

Additional details relating to operation of portions of the device 10 in computing distances to, and speeds of, moving objects, such as the objects 12 and 14, are also described more fully in the aforementioned patent, U.S. Pat. No. 5,539,404.

The device 10 further includes a data input/output (I/O) device 44. The I/O device 44 is here shown to include a display/annunciation device 46 and an input device 48. The elements of the data I/O device 44 are operative in conventional manner to provide visual, aural, or other display of information generated during operation of the device 10. The input device 48 may, for example, be formed of an actuation key pad to permit an operator of the device 10 to input operating commands or data to cause, or to alter, operation of the device 10. While not illustrated in the figure, the device 10 further preferably includes a universal asynchronous receiver/transmitter (UART).

In addition to the speed and range information provided by the laser-based speed measuring device disclosed in the aforementioned patent, the device 10 is further operative to determine the separation distances separating two moving objects, such as the moving objects 12 and 14. The microprocessor 32 further executes algorithms operative to determine such separation distances responsive to ranges to, and speeds of, the objects 12 and 14, also determined during operation of the device 10.

More particularly, during operation of the device 10, an operator first targets the device 10 at a first of the moving objects, here, for example, object 12. Laser pulses are transmitted to the moving object 12, and reflections therefrom are detected by the range finder 16. The range between the location of the device 10 and the moving object 12 is determined, and the speed of the moving objects 12 is calculated by execution of appropriate algorithms of the microprocessor 32. A timer, preferably a software timer forming a portion of the microprocessor 32, is started when the first object 12 is targeted.

Thereafter, the operator of the device 10 redirects the device to target the second moving object, here, for example, the moving object 14. Laser pulses 22 are transmitted to the moving object 14, and reflections therefrom are detected by the range finder 16. A determination is made as to the range between the device 10 and the second moving object 14, and the speed of the second moving object 14 is calculated by execution of appropriate algorithms by the microprocessor 32. The timer, started when the first object 12 is targeted, is stopped when the second object 14 is targeted. The elapsed time between targeting of the two objects is thereby stored by the timer.

Responsive to the ranges to objects 12 and 14, a calculated speed of at least one of the moving objects 12 and 14, and the times at which the moving objects are targeted, as indicated by the timer, additional algorithms executable by the microprocessor 32 calculate the separation distance separating the two moving objects.

In one embodiment, the calculated separation distance is supplied to the display/annunciation device 46 to provide an operator of the device 10 with an indication of the calculated separation distance separating the objects 12 and 14. The speeds of, and the ranges to, the objects 12 and 14 may also be displayed upon the device 46.

In another embodiment of the present invention, the memory element 34 further stores data relating to minimum allowable separation distances between motor vehicles in various jurisdictions. Some jurisdictions mandate the minimum separation distances to be dependent upon speed. Viz., the required separation distances increase when the speeds at which the vehicles are permitted to be operated increases. The memory element 34 is further operative, if needed, to store such plurality of separation distances.

By way of actuation of the input device 48, an operator of the device 10 indicates the jurisdiction in which the device 10 is being operated, the device 10 is targeted at moving vehicles, here represented by the moving objects 12 and 14, in manners described above, and the separation distance separating the vehicles is calculated through operation of the microprocessor 32, all as described above.

The device 10 may further be custom-designed for use in a particular jurisdiction by storing data in the memory element specific to the provisions of the motor vehicle code of the particular jurisdiction.

Once the separation distance is calculated, the calculated separation distance is compared with a value of the data stored in the memory element 34, and an annunciation is generated by the device 46 if the calculated separation distance is less than the separation distance stored in the memory element 34. When a plurality of different minimum separation distances based upon speeds are utilized by a particular jurisdiction, the speed of the motor vehicle is utilized to index particular data stored in the memory element associated with such speed.

Figure 2:
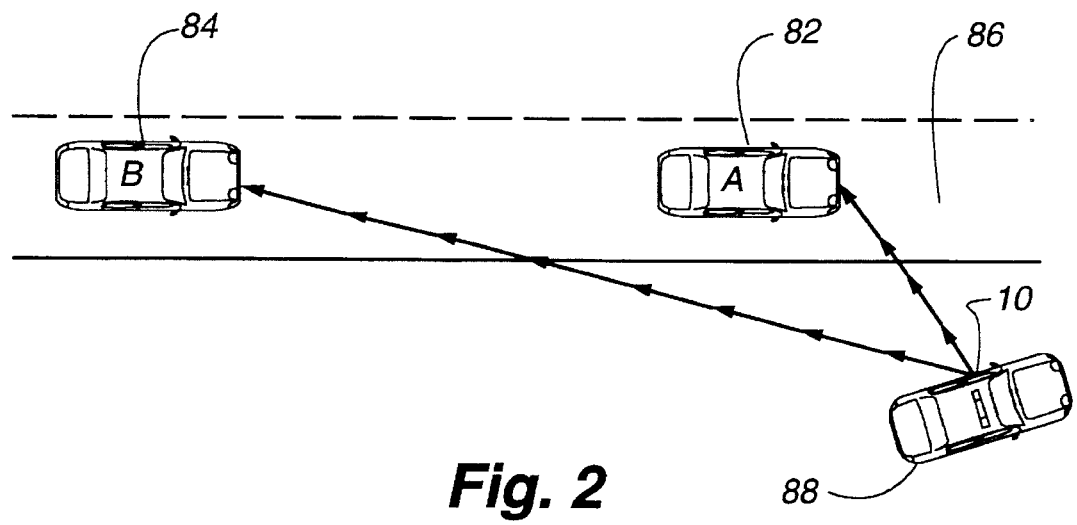
FIG. 2 is a diagram illustrating operation of the device shown in FIG. 1 to determine separation distances separating two motor vehicles, here when the device is positioned at a measuring position in front of a forward-most of the two vehicles.

FIG. 2 illustrates an exemplary manner by which the device 10 may be utilized, here by constabulary, or other traffic enforcement, officials to ensure that a motorist operating a motor vehicle on a roadway maintains at least a minimum separation distance between the motor vehicle that the motorist is operating and a motor vehicle positioned thereinfront.

As illustrated in the exemplary figure, a first, or forward-most, vehicle 82 is followed by a second, or rear-most, vehicle 84. Both the vehicles 82 and 84 are travelling upon a roadway 86. One or more constabulary, or other traffic enforcement, officials located in an enforcement vehicle 88 is positioned at, or beyond, a burm of the roadway 86. The device 10 is positioned at, or in, the vehicle 88.

In one embodiment of the present invention, the device 10 is first targeted at the first vehicle 82 to determine the range to the first vehicle 82 and the speed thereof at a first time, $T_1$. Then, the device is targeted at the second vehicle 84, the range to the second vehicle 84, and the speed thereof, are then determined.

As a finite amount of time is required to target the second vehicle 84 subsequent to targeting of the first vehicle 82, the second vehicle 84 is targeted at a second time, $T_2$, rather than the first time, $T_1$. In this manner, the range to the first vehicle 82 at time $T_1$, the speed of the first vehicle 82, the range to the second vehicle 84 at the second time $T_2$ and the speed of the second vehicle 84 are determined by operation of the device 10.

Thereafter, the separation distance (SD) separating the two vehicles 82 and 84 at the second time, $T_2$ is calculated by the following equation:

$$SD = (R_{BT2} - R_{AT1}) + S_A(T_2 - T_1)$$

wherein:

$R_{BT2}$ is the range to the second vehicle at the time $T_2$;

$R_{AT1}$ is the range to the first vehicle at the time $T_1$;

$S_A$ is the speed for the first vehicle;

$T_2$ is the second time, $T_2$; and $T_1$ is the first time, $T_1$.

$T_2 - T_1$ is the elapsed time between targeting of the first and second vehicles.

Alternately, the separation distance (SD) can be calculated at the first time, $T_1$ by the following equation:

$$SD = (R_{BT2} - R_{AT1}) + S_B(T_2 - T_1)$$

wherein:

$S_B$ is the speed of the second vehicle; and the remaining variables are as defined above.

If the separation distance is less than a minimum separation distance, the constabulary, or other traffic enforcement, officials are provided an indication of such, and appropriate enforcement actions can be taken.

Alternatively, the second vehicle 84 may be first targeted with the device 10 and, thereafter, the first vehicle 82 can be targeted with the device 10, also to determine the separation distance separating the vehicles 82 and 84.

Figure 3:
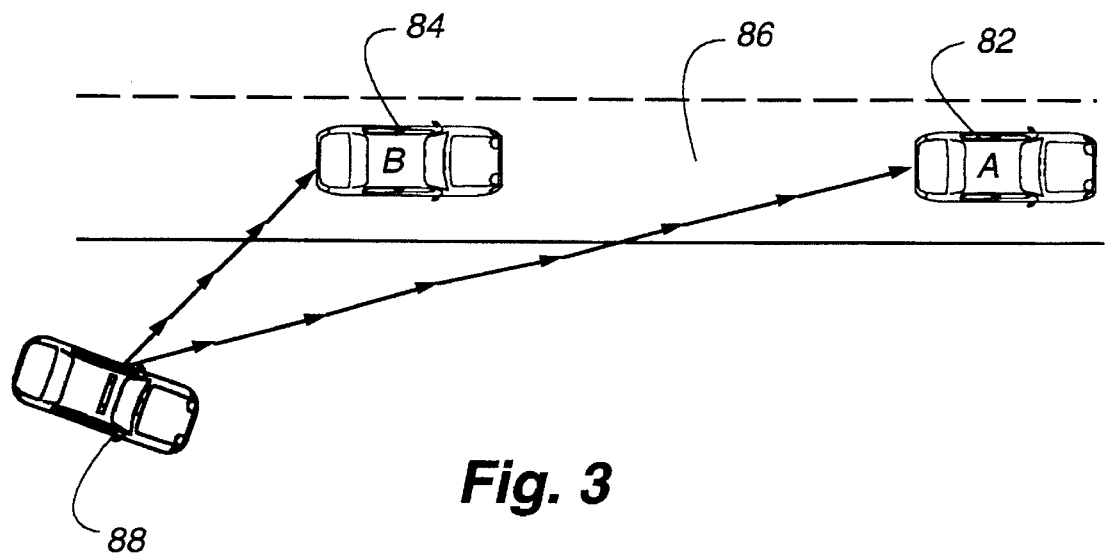
FIG. 3 is a diagram, similar to that shown in FIG. 2, again illustrating operation of the device shown in FIG. 1 to determine separation distances separating two motor vehicles, but here when the measuring position at which the device is located is to the rear of a rear-most of the two motor vehicles.

FIG. 3 is similar to that of FIG. 2, but illustrates positioning of the enforcement vehicle 88 and the device 10 located therein when the vehicle 88 is positioned behind the second, or rearmost, vehicle 84.

In one embodiment of the arrangement shown in FIG. 3, the device 10 first targets the first vehicle 82, the range to the first vehicle 82 is determined, and the speed thereof is calculated. Then, the device 10 is targeted at the second vehicle 84, the range to the second vehicle 84 is determined, and the speed thereof is calculated. Again, because of the finite amount of time required to retarget the second vehicle 84 after targeting the first vehicle 82, the second vehicle 84 is targeted at a second time, $T_2$, while the first vehicle 82 is targeted at the first time, $T_1$.

Alternatively, the second vehicle 84 can first be targeted and, thereafter, the first vehicle 82 can be targeted.

Equations analogous to those set forth above are utilized to determine the separation distances separating the first and second motor vehicles 82 and 84. When the separation distance is less than a minimum separation distance, the constabulary, or other traffic enforcement, officials can take appropriate enforcement actions.

Appropriate manipulation of either of the above equations can be performed to determine the separation time (ST) between the positioning of the two vehicles at the same location. More particularly, by algebraic manipulation of the equation of the separation distance at the first time $T_1$, the separation time (ST) can be determined to be:

$$ST = SD/S_B = [(R_{BT2} - R_{BT1}) + S_B(T_2 - T_1)]/S_B$$

wherein the variables are as defined previously.

In an alternate embodiment of the present invention, the separation time can be utilized to provide an indication of the separation distance separating the vehicles. For any particular speed of travel of the motor vehicles, the separation time must be at least a certain time; otherwise the separation distance between the vehicles is less than the proper amount.

An indication of the separation distances separating the motor vehicles 82 and 84 may also be determined by such calculation of time.

Figure 4:
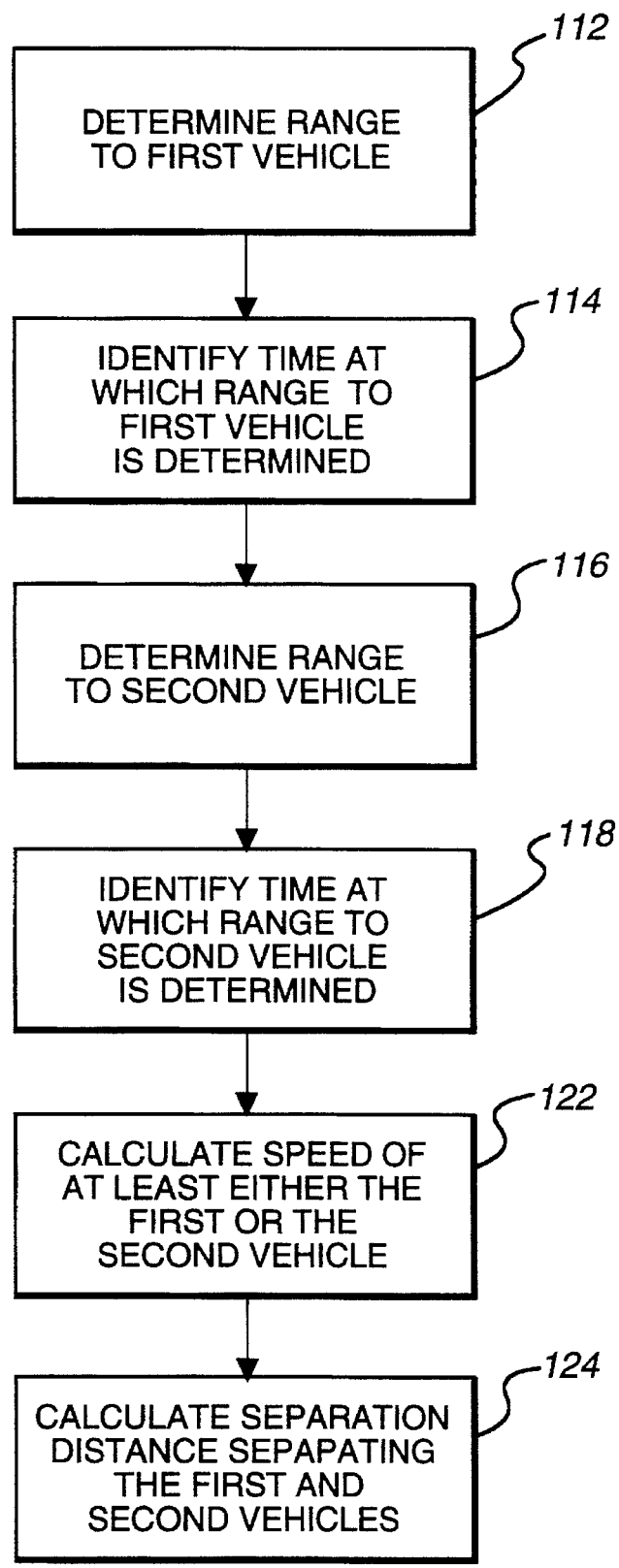
FIG. 4 is a flow diagram listing the method steps of a method of an embodiment of the present invention.

FIG. 4 illustrates the method of operation of an embodiment of the present invention. The method can be effectuated, for example, by operation of the device 10 shown in FIG. 1.

First, and as indicated by the block 112, the range to a first vehicle is determined. Then, and as indicated by the block 114, the time when this first range is determined is identified.

Thereafter, and as indicated by the block 116, the range to a second vehicle is determined. Then, as indicated by the block 118, the time at which this range is determined is identified.

Then, and as indicated by the block 122, the speed of at least either the first vehicle or the second vehicle is calculated.

Finally, and as indicated by the block 124, the separation distance separating the first and second vehicles is calculated. If the separation distance separating the vehicles is less than a minimum separation distance, appropriate actions may be taken by enforcement officials.

The device and method of the present invention provides a quantitative indication of the separation distances separating moving objects, such as motor vehicles travelling along a roadway. When at least minimum separation distances between motor vehicles are not maintained, appropriate enforcement personnel can take appropriate enforcement actions.

Presently-preferred embodiments of the present invention have been described with a degree of particularity. The previous descriptions are of preferred examples for implementing the invention, and the scope of the invention should not necessarily be limited by this description. The scope of the present invention is defined by the following claims:

What is claimed is:

1. A device for determining a value that is representative of a separation distance that separates first and second moving objects, said device comprising:

a range determiner positioned at a remote position remote from the first and second moving objects, said range determiner for determining a first range between the remote position and the first moving object wherein said first range is determined at a first time, and for determining a second range between the remote position and the second moving object wherein said second range is determined at a second time;

a speed determiner for determining values of speed of at least one of the first moving object and the second moving object; and calculating circuitry operative responsive to the first range and the second range determined by said range determiner, the values of speed determined by said speed determiner, and an elapsed time interval between the first time and the second time at which the determinations of the first range and the second range are determined by said range determiner, said calculating circuitry for calculating values representative of the separation distance that separates the first and second moving objects.

2. The device of claim 1 wherein said calculating circuitry comprises processing circuitry having algorithms executable therein for calculating the separation distance separating the first and second moving objects.

3. The device of claim 1 further comprising an indicator coupled to said separation distance calculating circuitry, said indicator for indicating the separation distance calculated by said separation distance calculating circuitry in human perceptible form.

4. The device of claim 1 wherein the first and second moving objects comprise first and second motor vehicles, said device further comprising a memory element for storing data therein representative of permitted separation distances between the first and second moving vehicles travelling at at least one speed.

5. The device of claim 4 wherein the data stored in said memory element comprises data representative of permitted separation distances between the first and second moving vehicles travelling at a plurality of different speeds.

6. The device of claim 4 wherein the data stored in said memory element comprises data representative of permitted separation distances in a plurality of different jurisdictions between the first and second moving vehicles.

7. The device of claim 4 further comprising a comparator coupled to receive the data stored in said memory element and coupled to receive the separation distance calculated by said calculating circuitry, said comparator for comparing values of the data with values of the separation distance and for generating an annunciation signal when the value of the separation distance is less than the value of the data.

8. A device for determining a value representative of a separation distance separating first and second moving objects, said device comprising:

a laser range finder positioned at a remote position remote from the first and second moving objects, said laser range finder for determining a first range between the remote position and the first moving object and for determining a second range between the remote position and the second moving object;

a speed determiner for determining values of speed of at least one of the first moving object and the second moving object; and calculating circuitry operative responsive to the first range and the second range calculated by said laser range finder, the speeds determined by said speed determiner, and an elapsed time between determinations of the first range and the second range determined by said laser range finder, said calculating circuitry for calculating values representative of the separation distance separating the first and second moving objects.

9. The device of claim 8 wherein said laser range finder further comprises processing circuitry coupled to said laser range finder, said processing circuitry having algorithms executable therein for calculating the first range and the second range.

10. The device of claim 8 wherein said speed determiner comprises processing circuitry coupled to said laser range finder determiner, said processing circuitry having algorithms executable therein for calculating the values of speed of the at least one of the first moving object and the second moving object.

11. The device of claim 9 wherein said processing circuitry is further operative to determine the elapsed time between the determinations of the first range and the second range.

12. A method for determining a value representative of a separation distance separating first and second moving objects, said method comprising the steps of:

determining a first range between a measuring position located remote from both the first and the second moving objects and the first moving object, said first range being determined at a first time;

determining a second range between the measuring position and the second moving object, said second range being determined at a second time;

determining values of speed of at least one of the first moving object and the second moving object; and calculating the value representative of the separation distance separating the first and second moving objects based upon said first range, said second range, a time interval that exists between said first time and said second time, and said values of speed of at least one of the first moving object and the second moving object.

13. The method of claim 12 comprising the further step of indicating in human perceptible form the value representative of the separation distance calculated during said step of calculating.

14. The method of claim 12 wherein the first and second moving objects comprise first and second motor vehicles and wherein the method comprises the further step of storing data representative of permitted separation distances between the first and second moving vehicles travelling at at least one speed.

15. The method of claim 14 comprising the further steps of:

comparing the data stored during said step of storing with the value representative of the separation distance calculated during said step of calculating; and generating an annunciation signal when the value representative of the separation distance is of a value less than a value of the data.

16. In a laser range finder and speed detector for determining ranges between a measuring position and a least first and second moving objects and for determining speeds of the at least first and second moving objects, an improvement of a circuit for determining values representative of a separation distance separating the first and second moving objects, said circuit comprising:

separation distance calculating circuitry operative responsive to the ranges between the measuring position and the first and second moving objects, the speed of at least one of the first and second moving objects, and an elapsed time between times at which the ranges between the measuring position and the first and second moving objects, said separation distance calculating circuitry for calculating the values representative of the separation distance separating the first and second moving objects.

* * * * *